United States Patent
Lee et al.

(10) Patent No.: US 10,783,607 B2
(45) Date of Patent: Sep. 22, 2020

(54) METHOD OF ACQUIRING OPTIMIZED SPHERICAL IMAGE USING MULTIPLE CAMERAS

(71) Applicant: KAI INC., Yuseong-gu, Daejeon (KR)

(72) Inventors: Jung Jin Lee, Gapyeong-gun Gyeonggi-do (KR); Seung Hoon Cha, Yuseong-gu Daejeon (KR); Dae Hyeon Wi, Seo-gu Daejeon (KR); Jae Hwan Kwon, Yuseong-gu Daejeon (KR); Young Hui Kim, Yuseong-gu Daejeon (KR); Seung Hwa Jeong, Seo-gu Daejeon (KR); Kye Hyun Kim, Seoul (KR); Bum Ki Kim, Yuseong-gu Daejeon (KR)

(73) Assignee: KAI INC., Yuseong-Gu, Daejeon (KR)

( * ) Notice: Subject to any disclaimer, the term of this patent is extended or adjusted under 35 U.S.C. 154(b) by 0 days.

(21) Appl. No.: 15/563,549

(22) PCT Filed: Dec. 29, 2016

(86) PCT No.: PCT/KR2016/015511
§ 371 (c)(1),
(2) Date: Sep. 29, 2017

(87) PCT Pub. No.: WO2018/066760
PCT Pub. Date: Apr. 12, 2018

(65) Prior Publication Data
US 2019/0220952 A1    Jul. 18, 2019

(30) Foreign Application Priority Data
Oct. 6, 2016  (KR) .................. 10-2016-0128947

(51) Int. Cl.
*G06T 3/00* (2006.01)
*G06T 3/40* (2006.01)
(Continued)

(52) U.S. Cl.
CPC .......... *G06T 3/0062* (2013.01); *G06T 1/0007* (2013.01); *G06T 3/005* (2013.01); *G06T 3/4038* (2013.01); *H04N 5/23238* (2013.01)

(58) Field of Classification Search
CPC ... G06T 3/0062; G06T 1/0007; G06T 3/4038; G06T 3/005; G06T 2207/20221;
(Continued)

(56) References Cited

U.S. PATENT DOCUMENTS 9,269,187 B2 * 2/2016 Chang .................. G06T 17/00
2012/0176471 A1  7/2012 Cheng et al.
(Continued)

FOREIGN PATENT DOCUMENTS

| KR | 20040064966 A | 7/2004 |
| KR | 20100070160 A | 6/2010 |
| KR | 20140112909 A | 9/2014 |

OTHER PUBLICATIONS

Lee et al., "Rich360: Optimized Spherical Representation from Structured Panoramic Camera Arrays", ACM Transaction on Graphics, vol. 35, Issue 4, Article No. 63, 2016, 11 pages.

*Primary Examiner* — Wesley J Tucker
(74) *Attorney, Agent, or Firm* — Hoffman Warnick LLC

(57) ABSTRACT

Provided is a method of acquiring an optimized closed curved surface image using multiple cameras, and more particularly, an image providing method that produces a single image using a plurality of cameras fixed to a rig and having different capturing viewpoints, the method including projection operation of acquiring a single image by projecting images acquired from the plurality of cameras on a projection surface of a closed curved surface based on parameter information, rendering operation of fitting the acquired single image in a quadrangular frame for each region through a non-uniform sampling process, and view-
(Continued)

ing operation of mapping the sampled image to a viewing sphere.

12 Claims, 24 Drawing Sheets

(51) Int. Cl.
*H04N 5/232* (2006.01)
*G06T 1/00* (2006.01)

(58) Field of Classification Search
CPC . G06T 3/0018; G06T 3/0006; H04N 5/23238; H04N 5/2628
See application file for complete search history.

(56) References Cited

U.S. PATENT DOCUMENTS

| | | |
|---|---|---|
| 2013/0243351 A1 | 9/2013 | Feng et al. |
| 2015/0130942 A1 | 5/2015 | Fujita et al. |
| 2015/0249815 A1 | 9/2015 | Sandrew et al. |
| 2015/0302648 A1* | 10/2015 | Zhang ................. H04N 13/344 345/426 |
| 2016/0353090 A1* | 12/2016 | Esteban ............. G02B 27/0172 |
| 2018/0240223 A1* | 8/2018 | Yi ........................... G06T 15/20 |
| 2019/0139296 A1* | 5/2019 | Lakshman ............ G06T 3/0062 |

* cited by examiner

METHOD OF ACQUIRING OPTIMIZED SPHERICAL IMAGE USING MULTIPLE CAMERAS

TECHNICAL FIELD

Embodiments relate to a method of acquiring an optimized spherical image using multiple cameras, and more particularly, to an image providing method that produces a single image using a plurality of cameras fixed to a rig and having different capturing viewpoints.

BACKGROUND ART

With the growth of multi-projection based immersive movie viewing platforms such as ScreenX, the Barco Escape System, and the like, the expansion of virtual reality (VR) market, and the active production of VR content, a next generation content market based on an immersive platform is expanding.

Further, in addition to the spread of various VR content reproduction environments, an environment requiring a high quality of image in all directions and an environment for focusing on a center of a screen and setting a surrounding atmosphere are developing at the same time.

In particular, in a case of producing a panoramic image by stitching images into a single image through multiple cameras, there arise issues related to quality and distortion of an overlapping portion and a final image.

To solve the foregoing, many theses and patents have suggested a variety of solutions. For example, there are Korean Patent No. 10-0519929 and Korean Patent No. 10-1021847.

DISCLOSURE OF INVENTION

Technical Goal

To solve the issues described above, an aspect of the present invention provides an image providing method that may solve an image quality loss and a distortion issue that may occur during a process of connecting images acquired from a plurality of cameras.

However, the objective of the present disclosure is not limited to the aforementioned goal, and other unmentioned objectives may be clearly understood from the following description by those having ordinary skill in the art to which the present disclosure pertains.

Technical Solutions

As a device to solve the goal described above, according to an aspect of the present invention, there is provided a method of producing a single spherical image using a plurality of cameras fixed to a rig and having different capturing viewpoints, a method of acquiring an optimized spherical image using multiple cameras, the method including acquiring a single image by projecting images acquired from the plurality of cameras on a projection surface of a predetermined irregular closed curved surface based on parameter information.

Here, the projection surface of the closed curved surface may vary based on depths of the images.

The method may further include calibration operation of obtaining parameter information corresponding to different positions and lines of sight of the plurality of cameras.

The calibration operation may include obtaining parameter information related to a positional relation of the plurality of cameras by capturing a physical pattern target such as checkerboard while changing a distance and an angle.

The method may further include rendering to fit the acquired single image in a quadrangular frame for each region through a non-uniform sampling process.

The method may further include viewing to map the sampled image to a viewing sphere.

Further, according to an aspect of the present invention, there is provided a method of producing a single spherical image using a plurality of cameras fixed to a rig and having different capturing viewpoints, a method of acquiring an optimized spherical image using multiple cameras, the method including stitching to acquire a single image using images acquired from the plurality of cameras, and rendering to fit the acquired single image in a quadrangular frame for each region through a sampling process.

In this example, the rendering may array pixels such that a significant region (for example, a region including a human face) in the image may have a higher resolution.

Further, according to an aspect of the present invention, there is provided a method of producing a single spherical image using a plurality of cameras fixed to a rig and having different capturing viewpoints, a method of acquiring an optimized spherical image using multiple cameras, the method including stitching to acquire a single image using images acquired from the plurality of cameras, rendering to fit the acquired single image for each region through a sampling process, and viewing to map the sampled image to a viewing sphere.

Further, according to an aspect of the present invention, there is provided a method of producing a single spherical image using a plurality of cameras fixed to a rig and having different capturing viewpoints, a method of acquiring an optimized spherical image using multiple cameras, the method including acquiring an existing 360-degree image, and rendering to fit the acquired 360-degree image in a quadrangular frame for each region through a non-uniform sampling process.

According to an aspect of the present invention, there is provided a method of generating a spherical image, the method including acquiring images from a plurality of cameras having different capturing viewpoints, and projecting the images on a projection surface of an irregular closed curved surface based on parameter information of the plurality of cameras.

The method may further include determining the projection surface of the irregular closed curved surface based on depths of the images.

The determining may include determining a depth of a target mesh point in a target frame based on a depth of a feature point that is extracted from an overlapping region between adjacent images and adjacent to the target mesh point.

The determining of the depth of the target mesh point may include determining the depth of the target mesh point further based on any one or any combination of a depth of a mesh point adjacent to the target mesh point, and a depth of a mesh point corresponding to the target mesh point in a frame adjacent to the target frame.

The method may further include rendering the projected image based on a mesh set along the projection surface of the irregular closed curved surface.

The rendering may include arraying pixels such that a relatively significant region in the projected image may have a higher resolution.

The rendering may include determining a target size of a quadrangular face included in the mesh based on significances of the quadrangular face, determining a size of the quadrangular face based on the target size of the quadrangular face, and sampling the projected image based on the size of the quadrangular face.

The determining of the size of the quadrangular face may include determining the size of the quadrangular face further based on any one or any combination of a similarity transformation item of the quadrangular face, a vertical and horizontal distortion prevention item in the quadrangular face, and a time smoothness item of the quadrangular face.

According to an aspect of the present invention, there is provided a method of generating a spherical image, the method including acquiring a 360-degree image generated using images acquired from a plurality of cameras having different capturing viewpoints, and rendering to fit the acquired 360-degree image in a quadrangular frame for each region through a non-uniform sampling process.

According to an aspect of the present invention, there is provided a method of reproducing a spherical image, the method including obtaining information related to a mesh generated through non-uniform rendering, acquiring an image sampled through the non-uniform rendering, and viewing to map the sampled image to a viewing sphere based on the information related to the mesh.

The information related to the mesh may include information related to sizes of quadrangular faces included in the mesh. The viewing may include mapping vertices included in the mesh to vertices included in the viewing sphere based on the information related to the sizes of the quadrangular faces.

Effect

The present disclosure may provide an image that may solve an image quality loss and a distortion issue that may occur during a process of connecting images acquired from a plurality of cameras.

BEST MODE FOR CARRYING OUT THE INVENTION

Figure 1A:
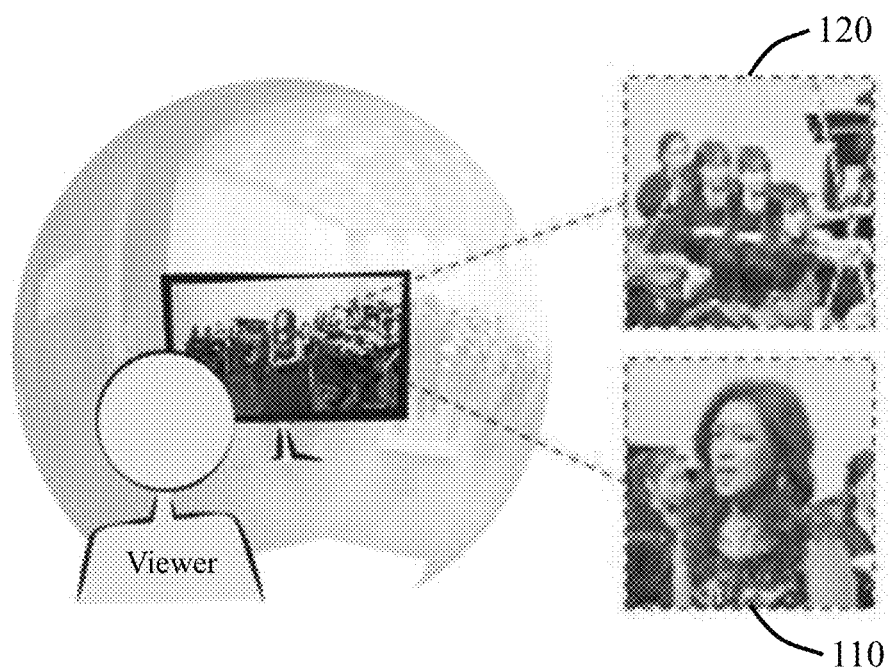
FIGS. 1A and 1B illustrate examples of creating a panoramic image using a plurality of cameras according to an embodiment.

Objectives and effects of the present disclosure and technical configurations to achieve them will be apparent from the embodiments described in detail hereinafter with reference to the accompanying drawings. When it is determined detailed description related to a related known function or configuration they may make the objective of the embodiments unnecessarily ambiguous in describing the embodiments, the detailed description will be omitted here.

Also, terminologies used herein are those defined in consideration of the functions in the present disclosure, and may be changed according to the intention of a user or an operator, or the custom.

However, the present disclosure is not limited to the embodiments described below, and may be implemented in many other ways. The embodiments are provided to make the disclosure complete and help those having ordinary skill in the art to comprehensively understand the scope of the present disclosure. The present disclosure is defined by the scope of the claims, and thus the definition should be made based on the comprehensive contents of the present specification.

Hereinafter, an image providing method will be described. The term "closed curved surface" used herein may be construed as a curved surface of a sphere.

The image providing method broadly includes the following operations. The first is a projection process, the second is a rendering process, and the last is a viewing process. A spherical image may be generated through the projection process and the rendering process. After that, the spherical image may be provided to a user through the viewing process.

Hereinafter, the processes will be described in detail.

A calibration process may be included prior to the projection process. The calibration process will be described in detail when describing an apparatus later. Herein, an apparatus for acquiring an image includes a plurality of cameras fixed using a rig. Thus, even when capturing images continually, lines of sight of the plurality of cameras do not change. Accordingly, parameter information may be obtained based on an initial positional relation of the cameras and utilized as a template continuously. For this, the calibration process is needed at an early stage.

In the calibration process, an object having a predetermined pattern such as a checkerboard is utilized. The plurality of cameras fixed through the rig capture the checkerboard which is a target to be captured, and the calibration process is performed by generating a single image using captured images. Here, to obtain more accurate calibration information, the process is performed repeatedly while changing an angle and a distance.

Through the calibration process, calibration factor information corresponding to positions of the cameras is obtained, whereby the template is provided. Accordingly, a parameter of a 360-degree camera may be obtained through the calibration process.

After the calibration process is performed, an image is captured through the image providing apparatus. During the process of capturing and acquiring the image, the projection operation is performed. The projection process projects input images on a projection surface based on the parameter information of the cameras obtained through the calibration process. In general, a projection surface is provided as a complete closed curved surface to acquire a 360-degree image. However, the projection surface has a limitation in representing a three-dimensional (3D) geometric form of a scene. That is, the projection surface may not reflect depth information of images.

Herein, a depth-variable projection surface is used. In a case of using such a depth-variable projection surface, parallax in an overlapping region of the images that may result from different viewpoints of the cameras may be efficiently reduced. That is, an existing method may match only an object in a distant view or a front view, whereas the present disclosure may acquire an accurately matched clear 360-degree image although objects are at various depths in an overlapping region.

Figure 1B:
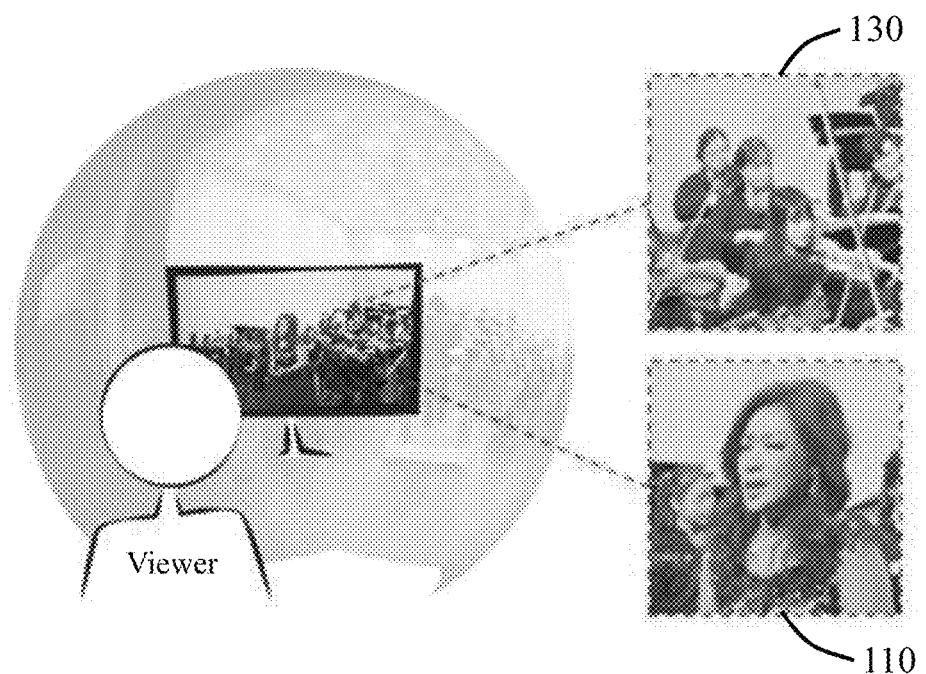

FIGS. 1A and 1B illustrate examples of creating a panoramic image using a plurality of cameras according to an embodiment. FIG. 1A illustrates a result of using a depth-fixed projection surface according to an existing technology, and FIG. 1B illustrates a result of using a depth-variable projection surface according to an embodiment. Referring to FIG. 1A, as a result of projecting an image based on a depth of a singer 110 positioned at a center of a scene, a parallax error occurs such that multiple images of musicians 120 having different depths are viewed. Conversely, referring to FIG. 1B, an image in which the singer 110 positioned at the center of the scene and musicians 130 having different depths are clearly represented may be acquired using the depth-variable projection surface.

The present disclosure is featured in that a neighboring region between two neighboring cameras may be divided by triangular elements, and a projection surface of a closed curved surface may be changed using 3D points formed by the triangular elements as constraint points.

In the rendering process, images of a shape of a connected irregular closed curved surface are adjusted using a quadrangular frame. The main idea of the present disclosure is in that a resolution of an image is changed and used by assigning a greater number of pixels to a significant region that is calculated based on a combination of an image gradient, a saliency, and a face detector or directly assigned by a user, and assigning a fewer number of pixels to other regions. For example, a portion of an image including a human face is regarded as a significant region and thus assigned with a greater number of pixels, and a region including an image such as a one-color wall which is a background is assigned with a fewer number of pixels, whereby the resolution of the image may be changed and used. The significant region may be set by the user, or automatically set based on a predetermined criterion.

In the projection process, a triangular or quadrangular mesh is used to project images on the projection surface of the irregular closed curved surface. A width and a height of each mesh surface are calculated based on significances of pixels in each mesh. That is, a larger region needs to be assigned to a mesh surface having a relatively great significance so as to have a greater number of pixels in a target image in a sampling process. A final ray mesh is determined through a process of optimizing a position of a vertex in an image space. Here, a ray refers to a single point on a surface on which images are projected. A ray in which each pixel is to be sampled in rendering to be described later is determined using the calculated mesh.

Each pixel in a final image is determined through sampling that projects pixels of each image on the projection surface of the closed curved surface along a ray linearly interpolated from an ambient vertex of the ray mesh using a closed curved surface coordinate system.

Last, the viewing process is a process in which the user maps the images created in the foregoing process to a viewing sphere for interactive viewing. The viewing sphere is set to have a resolution equal to a resolution of the final ray mesh. After that, when reproducing a 360-degree image, each frame image is texture-mapped to the viewing sphere. In this example, to restore a non-uniform rendered image to a form of the original image, a UV position of each vertex in the viewing sphere is determined based on UV information of a ray mesh sequence.

According to embodiments, the projection process and the rendering process described above may be applied simultaneously, or one of the projection process and the rendering process may be applied.

In an example, after the 360-degree image is acquired using the depth-variable projection surface through the projection process described above, a general rendering process of uniformly sampling an image without distinguishing a significant region may be applied, instead of the rendering process described above. In this example, the rendered image may be uniform. Thus, the image may be provided to the user through a general viewing process of restoring a uniform rendered image on a virtual sphere, instead of the viewing process described above.

In another example, after a general projection process using a depth-fixed projection surface is performed, instead of the projection process described above, more sampling may be performed in a significant region through the rendering process described above. In this example, a rendered image may be non-uniform. Thus, a form of the original image may be restored in a texture mapping process through the viewing process described above.

Hereinafter, the embodiments will be described further with reference to the equations and drawings.

First, the projection process will be described.

A projection sphere is expressed by m×n meshes. M={V, F,Q}. M denotes a mesh. V denotes a set of vertices of a spherical coordinate system, and V={$v_1$, . . . , $v_{m \times n}$}. Here, $v_i$=($\theta_i$,$\varphi_i$,r), which represents the spherical coordinate system. Hereinafter, $v_i$ may be referred to as a vertex, a peak, or a mesh point.

F denotes a set of triangular faces each including three adjacent vertices, and Q denotes a set of quadrangular faces each including four adjacent vertices.

A sphere mesh is generated through uniform sampling of m horizontal angles (0≤θ≤2π) and n vertical angles (0≤φ≤2π). A simple sphere has a single radial distance r. However, r performs a significant function as a zero parallax distance.

Based on the radial distance of the sphere, an overlapping portion may change. For example, objects at a depth corresponding to the radial distance of the sphere may be arrayed well when projected, whereas an object at a depth not corresponding to the size of the sphere or a background may have a parallax error (parallax artifact) when projected.

Figure 2A:
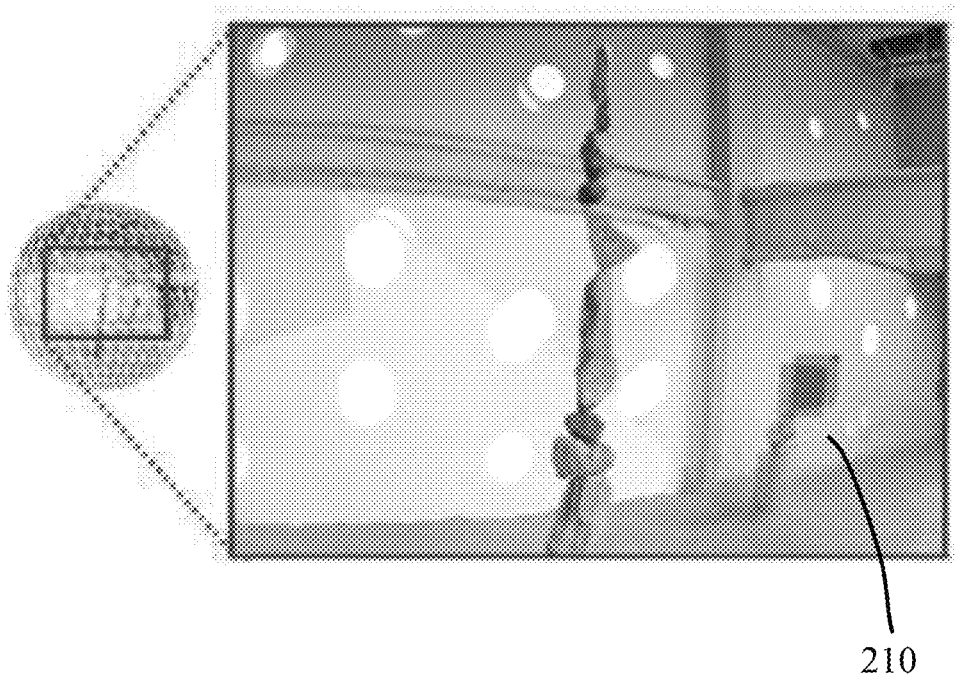
FIGS. 2A and 2B illustrate results of projecting an image on a sphere by changing a radial distance according to an embodiment.
Figure 2B:
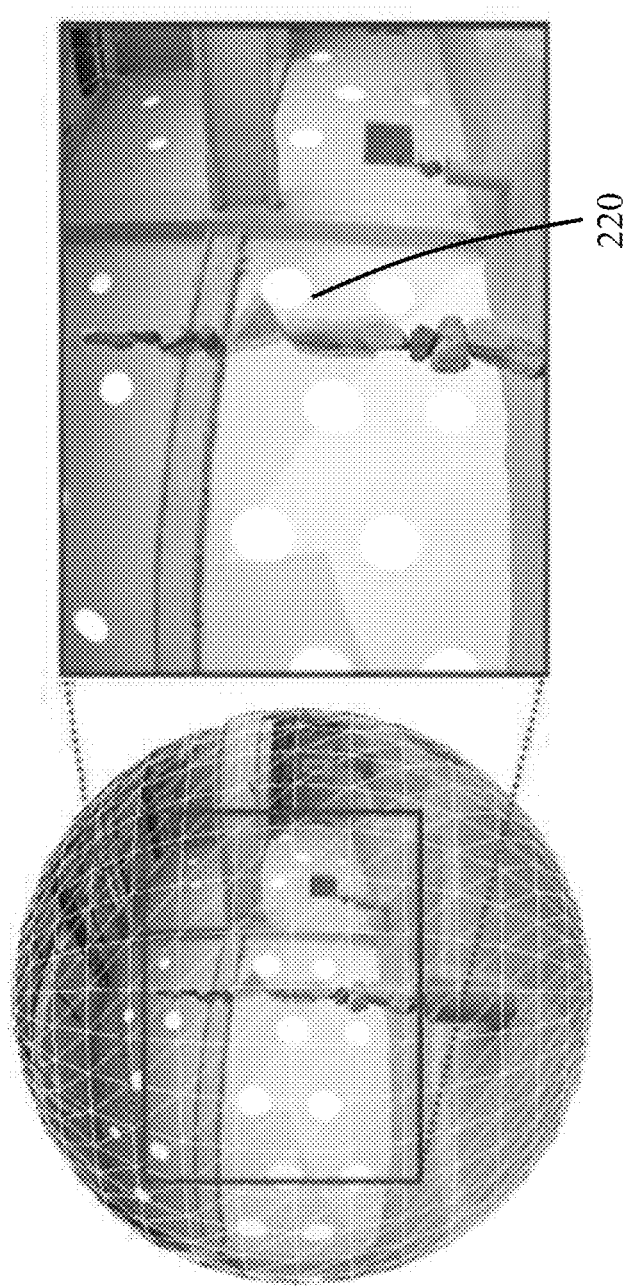

FIG. 2 illustrates results of projecting an image on a sphere by changing a radial distance according to an embodiment. Referring to FIG. 2, (a) illustrates a result of projecting an image on a sphere having a radial distance of 2.1 meters (m), and (b) illustrates a result of projecting an image on a sphere having a radial distance of 7 m. In the example of (a), a parallax error occurs in an object 210 having a depth greater than the radial distance of 2.1 m. In the example of (b), a parallax error occurs in an object 220 having a depth less than the radial distance of 7 m.

The projection process aims at generating an optimized projection surface $M^t$. Here, t denotes an index of a frame. That is, an optimized projection surface may be generated for each frame through the projection process. For example, each vertex has a radial distance $r_i^t$ in a frame t that partially changes. Here, i denotes an index of a vertex. As described above, the embodiments use a depth-variable projection surface, thereby minimizing parallax in an overlapping region between neighboring images.

To obtain the radial distance $r_i^t$ of each vertex, an actual distance of an object in an overlapping region needs to be known. A set of 3D points $P^t$ that restrain a mesh in an optimization process is calculated using a feature of the overlapping region. $P^t$ denotes a set of feature points extracted from the overlapping region in the frame t. In this example, sparse feature points are extracted from each image.

The actual distance may be known by performing stereo matching using the feature points, and $r_i^t$ of the projection surface may be set based on the actual distance. For example, a similarity between features of two neighboring images is determined to calculate a disparity. However, the disparity may not be calculated in a texture-less region. Thus, similar to a general stereoscopic image processing method, an additional disparity may be obtained from a down-sampled high-density similarity, which may be evaluated as using an optical flow method.

$p_k^t$ is a 3D point restored using camera parameters corresponding to the obtained disparity pair. The restoration is performed using linear triangulation, which is widely used in computer vision. An energy function is to measure a difference between $r_i^t$ (mesh point) and $p_k^t$ (feature point), and is defined as expressed by Equation 1.

$$E_p = \sum_k \left\| \sum_{i \in f(p_k^t)} \lambda_i^t r_i^t - r(p_k^t) \right\|^2 \quad \text{[Equation 1]}$$

Here, $p_k^t$ is converted to spherical coordinates $p_k^t \in P^t$. $f(p_k^t)$ denotes a set of indices of vertices constituting a face including $p_k^t$ in a two-dimensional (2D) polar coordinate system $(\theta, \varphi)$. $\lambda_i^t$ denotes a weight of a center of mass at coordinates $(\theta, \varphi)$ with respect to ambient vertices (ambient mesh points) of $p_k^t$. Equation 1 represents a linear combination of ambient vertices $r_i^t$ to match $r(p_k^t)$ which denotes a radial distance of $p_k^t$.

To smooth $r_i^t$ in a resulting mesh, a partial smoothness item may be defined as expressed by Equation 2. Further, since stereo matching may not be performed with respect to a non-overlapping region, $r_i^t$ included in the non-overlapping region may be obtained using Equation 2.

$$E_{s1} = \sum_i \left\| r_i^t - \frac{1}{n_i} \sum_{j \in N(i)} r_j^t \right\|^2 \quad \text{[Equation 2]}$$

Here, N(i) denotes indices of four connected neighboring vertices of $v_i^t$. $n_i$ denotes the number of neighboring vertices included in N(i). $E_{s1}$ denotes a Laplacian smoothness operation. This item may smoothly interpolate $r_i^t$ in a non-overlapping region by minimizing a quadratic partial differential coefficient of $r_i^t$.

However, if a gradient is relatively great in an overlapping region of $r_i^t$, minimization of $E_p$ and $E_{s1}$ leads to an unstable result. Thus, vertices not restrained by $E_p$ minimize and normalize an approximate first-order partial differential coefficient. Energy functions are given as expressed by Equations 3 and 4.

$$E_{dx} = \sum_{(i,j) \in \Omega} \left\| \frac{1}{2} r^t(i+1, j) - \frac{1}{2} r^t(i-1, j) \right\|^2 \quad \text{[Equation 3]}$$

$$E_{dy} = \sum_{(i,j) \in \Omega} \left\| \frac{1}{2} r^t(i, j+1) - \frac{1}{2} r^t(i, j-1) \right\|^2 \quad \text{[Equation 4]}$$

Here, $r^t(i,j)$ denotes a radial distance of $v_{ixn+j}^t$ in an i-th row and a j-th column of $M^t$. $\Omega$ denotes a set of vertices not restrained by $P^t$. $E_{dx}$ and $E_{dy}$ are estimates of the linear partial differential coefficient in a horizontal direction and a vertical direction. For example, 1'(i+1, j) denotes a radial distance of a right adjacent vertex of a vertex corresponding to (i,j), and $r^t(i-1, j)$ denotes a radial distance of a left adjacent vertex of the vertex corresponding to (i,j). Further, $r^t(i,j+1)$ denotes a radial distance of an top adjacent vertex of the vertex corresponding to (i,j), and $r^t(i,j-1)$ denotes a radial distance of a bottom adjacent vertex of the vertex corresponding to (i,j).

Figure 3A:
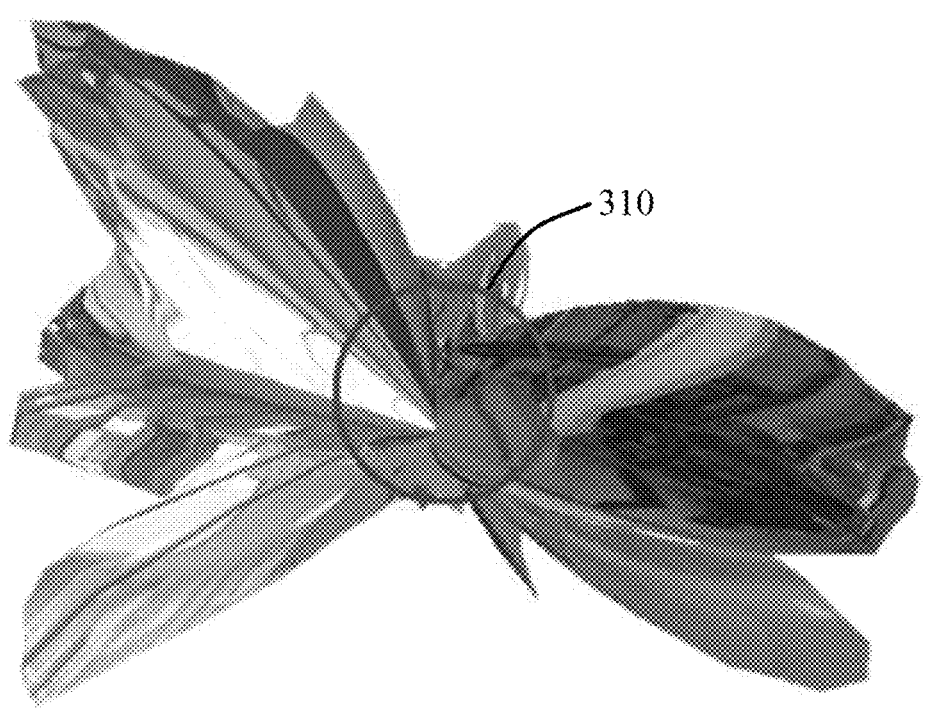
FIGS. 3A and 3B illustrate resulting meshes optimized using a differential coefficient according to an embodiment.
Figure 3B:
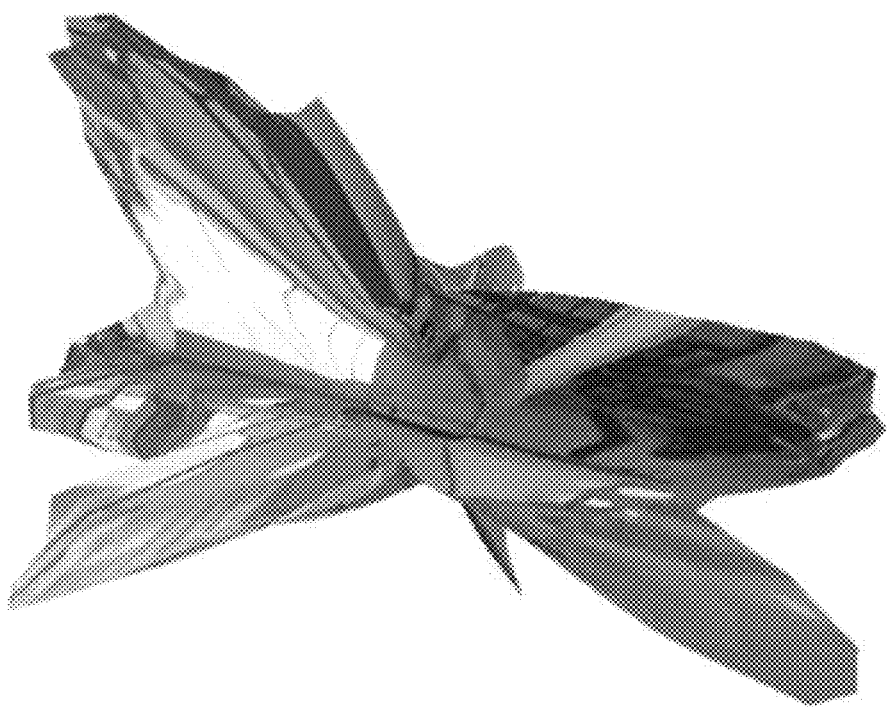

FIGS. 3A and 3B illustrate resulting meshes optimized using a differential coefficient according to an embodiment. FIG. 3A illustrates a resulting mesh optimized without using Equation 3, and FIG. 3B illustrates a resulting mesh optimized using Equation 3. Referring to FIG. 3A, a radical change occurs in an overlapping region 310. Referring to FIG. 3B, a radical change does not occur as a result of using Equation 3.

Equation 5 is an energy function for time smoothness. When a mesh changes for each frame, the mesh is smoothed by defining a constraint to minimize a difference between a current frame and another frame.

$$E_{t1} = \sum_i \left\| r_i^t - \frac{1}{2t_w} \sum_{j \in T(i,t)} r_j \right\|^2 \quad \text{[Equation 5]}$$

Here, $t_w$ denotes a window size of a time. T(i,t) denotes a set of indices of time neighboring vertices from a frame $t-t_w$ to a frame $t+t_w$ of $r_i^t$. That is, T(i,t) denotes a set of current vertices at different times. In an example, $t_w$ may be fixed to "3".

$r_i^t$ may be deduced based on the energy functions defined in Equations 1 through 5. For example, a set of $r_i^t$ that minimizes the energy functions defined in Equations 1 through 5, or that minimizes a weight sum of the energy functions defined in Equations 1 through 5 may be deduced.

Figure 4A:
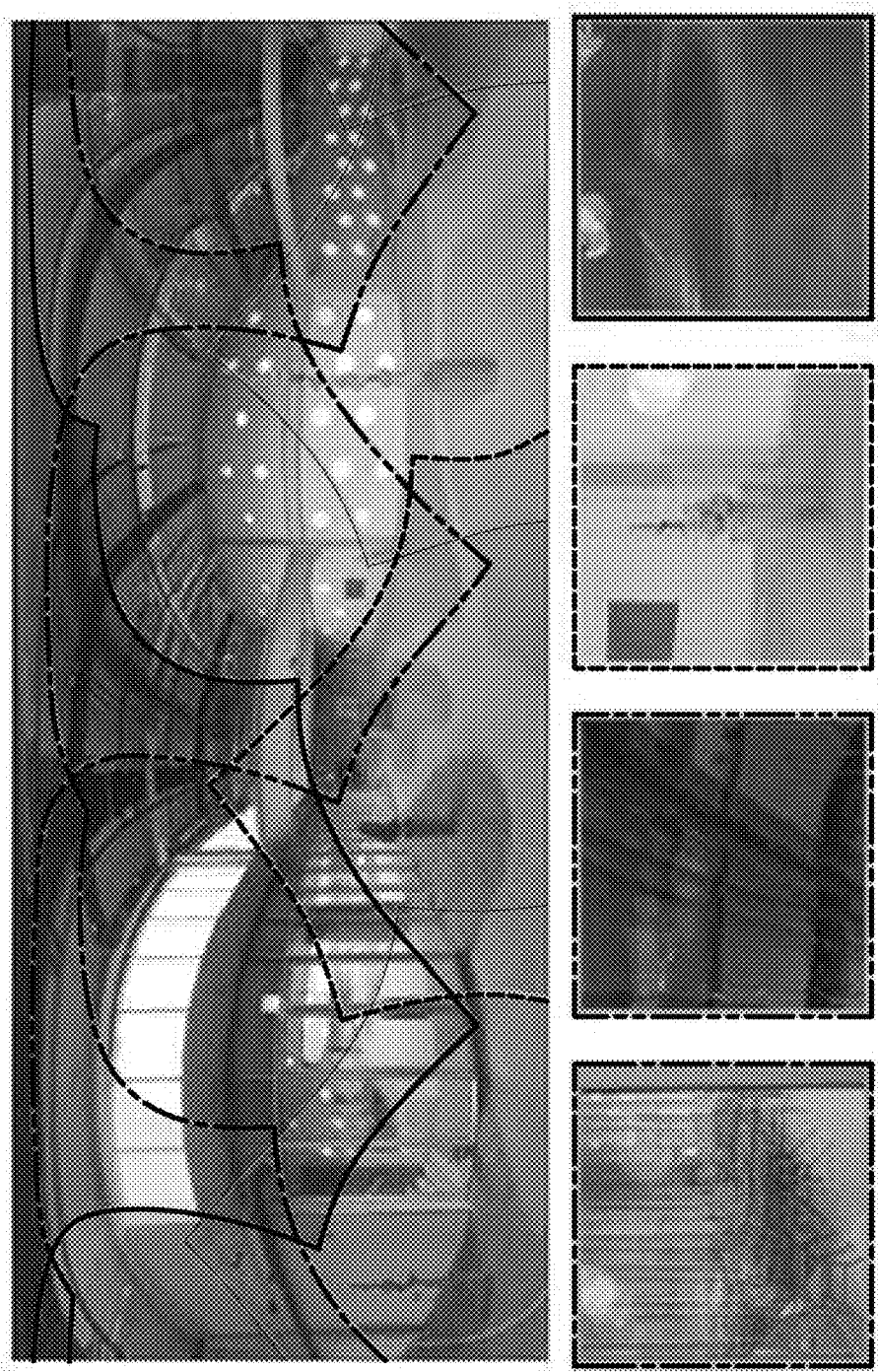
FIGS. 4A and 4B illustrate images acquired using a projection surface of a deformable closed curved surface according to an embodiment.
Figure 4B:
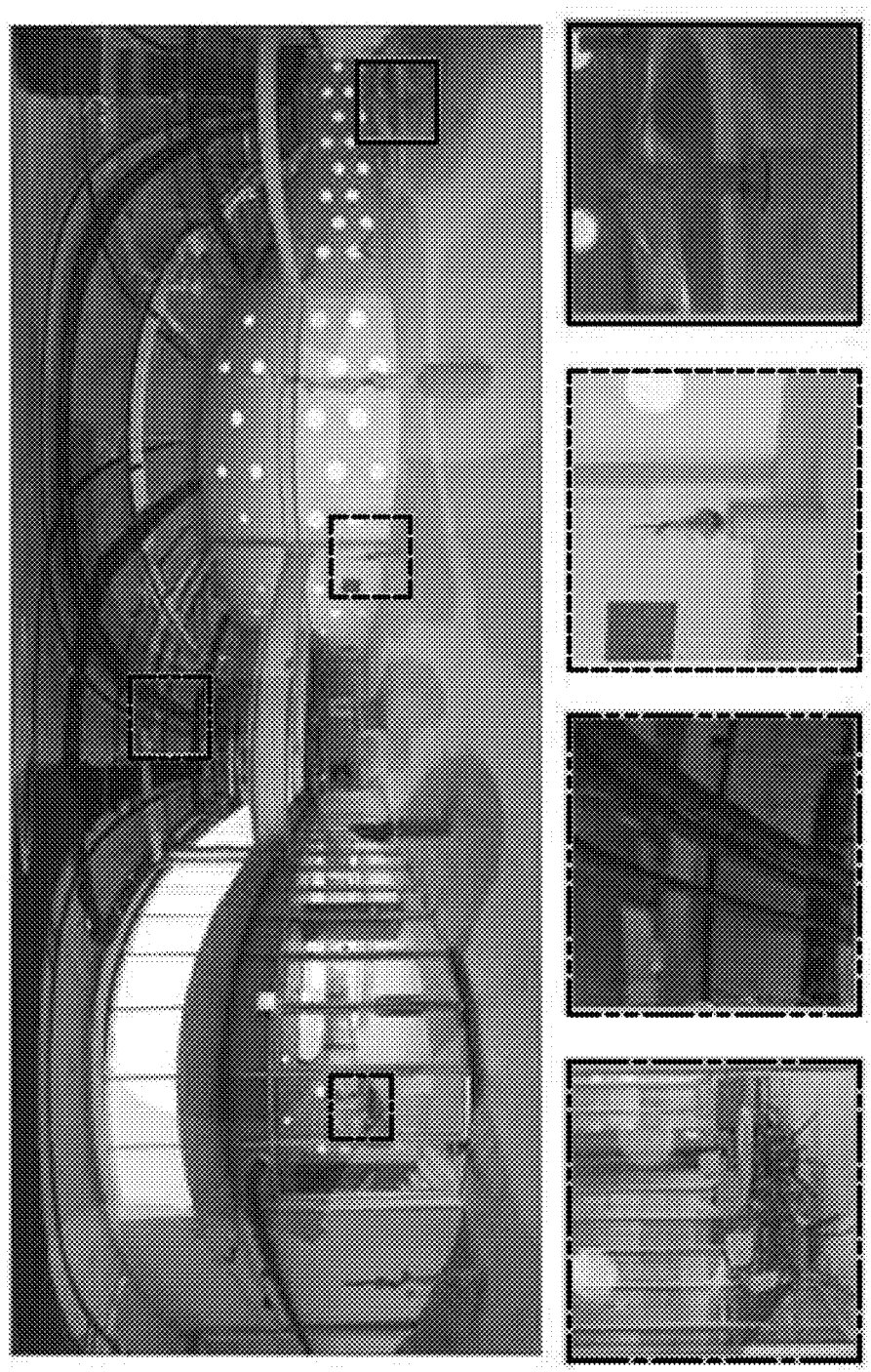

FIGS. 4A and 4B illustrate images acquired using a projection surface of a deformable closed curved surface according to an embodiment. FIG. 4A illustrates a result of acquiring a projection image from a simple sphere using an existing technology, and FIG. 4B illustrates a result of acquiring an image from a projection surface of a deformable closed curved surface according to an embodiment. Parallax errors shown in FIG. 4A are not shown in FIG. 4B.

Hereinafter, the rendering process will be described.

When a target resolution $I_{width} \times I_{height}$ is provided, a ray defined as $(\theta, \varphi)$ which is a pair of latitude and longitude is assigned to each pixel of each target image. A color of each pixel of a target image is determined through a process of sampling from an original image projected at a position corresponding to each ray.

Figure 5A:
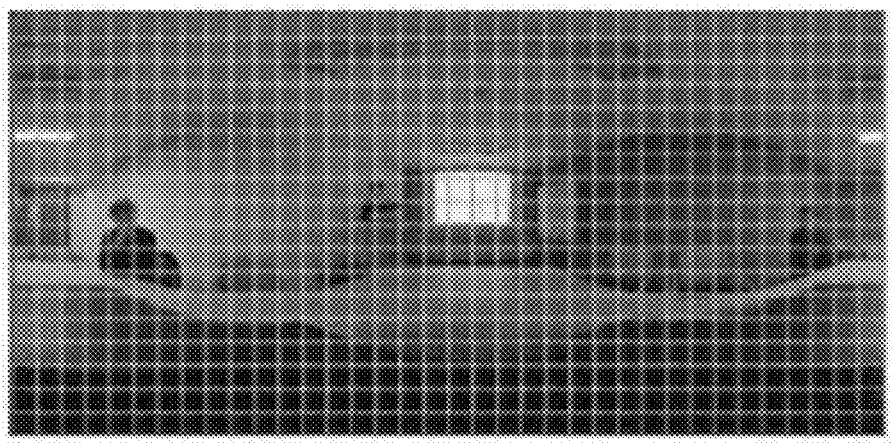
FIGS. 5A, 5B, 5C and 5D illustrate a rendering process according to an embodiment.

FIGS. 5A through 5D illustrate a rendering process according to an embodiment. Referring to FIG. 5A, an initial array of vertices having a predetermined distance in a target image corresponds to a square or a rectangle. Sizes of faces included in a mesh of FIG. 5A are uniform.

Figure 5B:
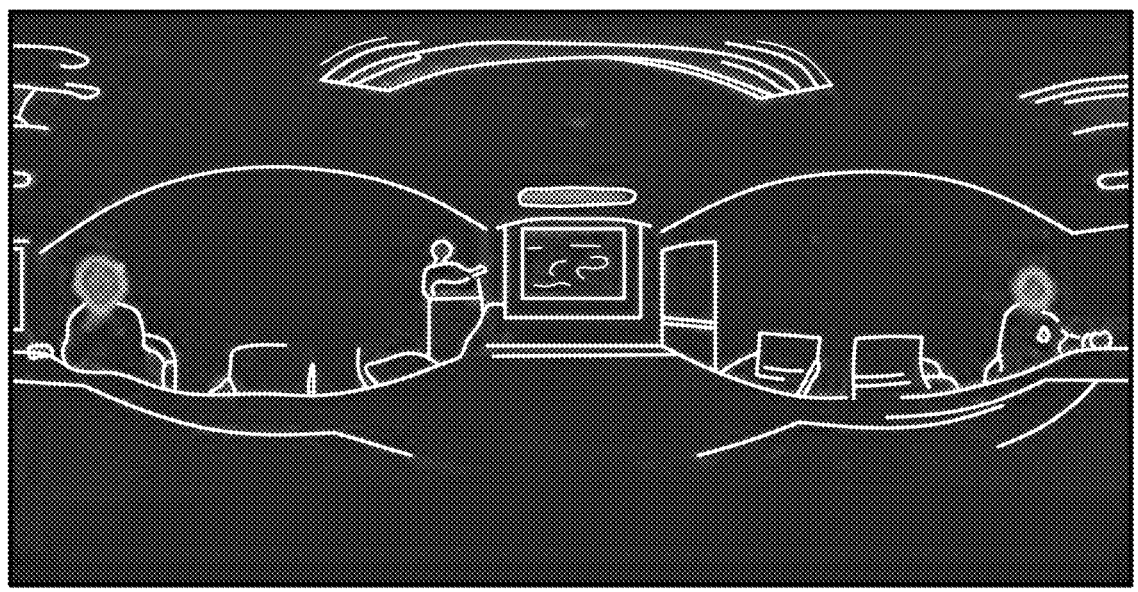

Referring to FIG. 5B, a significant region in an image may be automatically analyzed. For example, relatively bright points in FIG. 5B may correspond to a region recognized to be relatively significant when compared to relatively dark points.

Figure 5C:
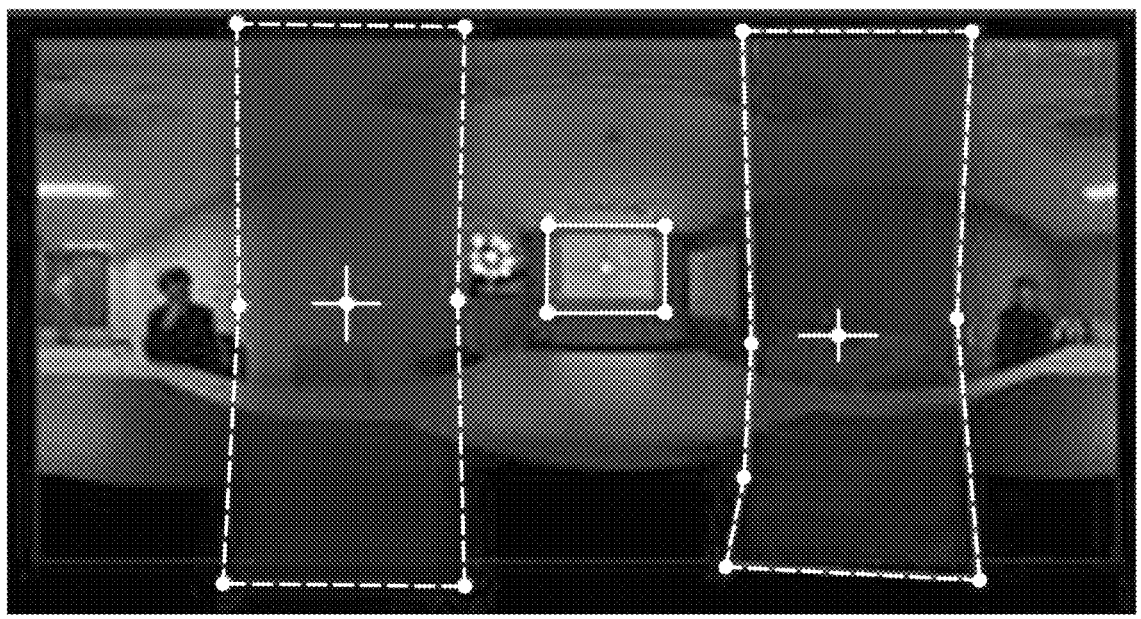

Referring to FIG. 5C, a significant region in an image may be designated by a user. For example, the user may designate a central region of a screen as a significant region, and designate a first space between the screen and a person on the left and a second space between the screen and a person on the right as relatively less significant regions.

A ray with respect to each pixel may be calculated using a linear interpolation $(\theta_i, \varphi_i)$ of an ambient vertex. The number of samples between neighboring vertices depends on a distance between image coordinates. Thus, if an image region occupied by a d-th quadrangular face $q_d^t$ of $M^t$ includes significant information, the region needs to be expanded. Based on whether the region includes significant information, $v_i^t$ of $M^t$ may be increased using 2D image coordinates $(x_i^t, y_i^t)$.

Figure 5D:
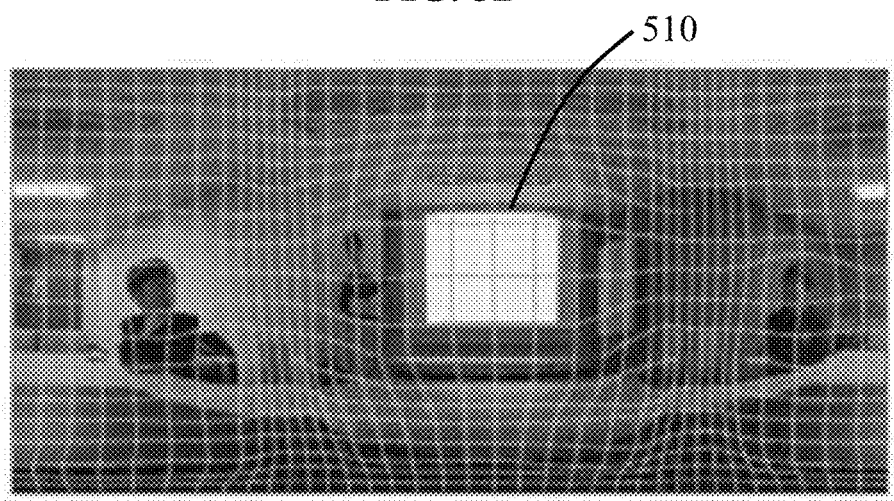

Referring to FIG. 5D, sizes of faces included in a mesh are non-uniform. In this example, a relatively significant region may have a relatively great face size. For example, a size of a quadrangular face corresponding to a screen region 510 is greater than a size of a quadrangular face of another region. In this example, more sampling may be performed in the quadrangular face in the screen region.

For the rendering process, an equation needs to be configured as an optimization issue of $(x_i^t, y_i^t)$ in a target image space. A target size of a quadrangular face (for example, a target width $qw_d^t$ and a target height $gh_d^t$ of a quadrangular face $q_d^t$) is determined based on significances $sx_d^t$ and $sy_d^t$ of the quadrangular face $q_d^t$, as expressed by Equation 6. $sx_d^t$ denotes a horizontal significance, and $sy_d^t$ denotes a vertical significance. The significances may be determined in various manners. For example, the significances $sx_d^t$ and $sy_d^t$ may be determined to be an average value of significances of internal pixels at $S_x$ and $S_y$ in each frame. In another example, as a value of image gradient increases, a significance may be determined to be relatively great or a significance of a face region detected through a face detection scheme may be determined to be relatively great.

$$\begin{cases} qw_d^t = \dfrac{(sx_d^t)^{Nc}}{\sum_{j \in row(d)} (sx_j^t)^{Nc}} \times I_{width} \\ qh_d^t = \dfrac{(sy_d^t)^{Nc}}{\sum_{j \in col(d)} (sy_j^t)^{Nc}} \times I_{height} \end{cases}$$ [Equation 6]

Here, row(d) and col(d) refer to sets of indices of quadrangular faces belonging to the same row and the same column as $q_d$. That is, d denotes an index of a quadrangular face, row(d) denotes a set of faces in the same row as the quadrangular face $q_d$, and col(d) denotes a set of faces in the same column as the quadrangular face $q_d$. Equation 6 calculates $qw_d^t$ and $gh_d^t$ based on proportions of $sx_d^t$ and $sy_d^t$ with respect to a sum of significances of the same row and the same column.

Figure 6:
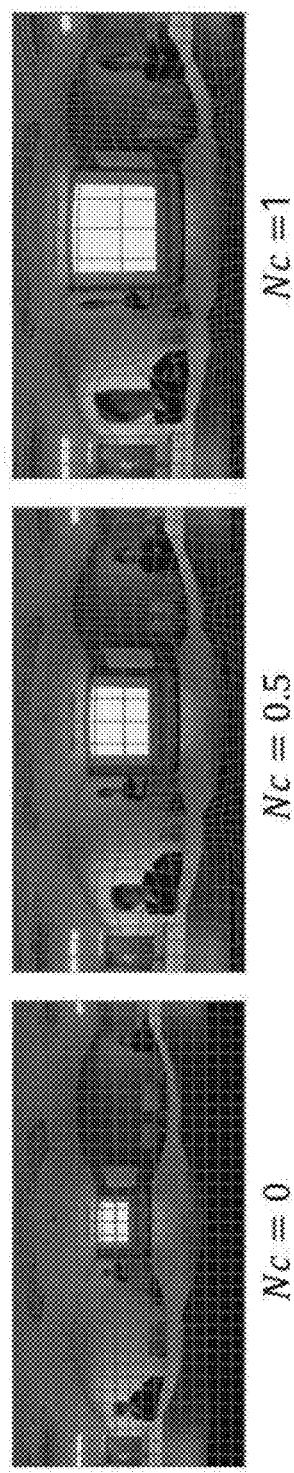
FIG. 6 illustrates an effect of $N_c$ on a resulting ray mesh according to an embodiment.

$N_c$ denotes a user parameter to determine a level of non-uniformity. FIG. 6 illustrates an effect of $N_c$ on a resulting ray mesh according to an embodiment. Referring to FIG. 6, as $N_c$ increases, a contrast of resolution between quadrangular faces to be obtained becomes stronger.

For optimization, a width and a height of each quadrangular face is restrained to $qw_d^t$ and $gh_d^t$ obtained from Equation 6. An energy function therefor is defined as expressed by Equation 7.

$$E_g = \sum_g \sum_{\{i,j\} \in hE(q_d^t)} \|(x_j^t - x_i^t) - qw_d^t\|^2 + \sum_d \sum_{\{i,j\} \in vE(q_d^t)} \|(y_j^t - y_i^t) - qh_d^t\|^2$$ [Equation 7]

Here, $hE(q_d^t)$ and $vE(q_d^t)$ denote sets of directed edges (for example, i→j) of $q_d^t$ in a horizontal direction and a vertical direction. $x_i$ and $x_j$ denote mesh points adjacent in the horizontal direction, and $y_i$ and $y_j$ denote mesh points adjacent in the vertical direction.

A similarity transformation item to ease a change in resolution with respect to quadrangular faces and to solve a flip issue of the quadrangular faces is defined as expressed by Equation 8. An energy function of Equation 8 enables a quadrangular face to maintain a quadrangular shape.

$$E_{s2} = \sum_f \beta_f^t \|v_{f1} - (v_{f2} + u(v_{f3} - v_{f2}) + vR_{90}(v_{f3} - v_{f2}))\|^2$$ [Equation 8]

$(v_{f1}, v_{f2}, v_{f3})$ denote vertices constituting a triangular face on an image surface, and $R_{90}$ denotes a 90-degree rotation matrix $$\begin{pmatrix} 0 & 1 \\ -1 & 0 \end{pmatrix}$$

Local coordinates u, v are calculated from an initial uniform mesh. $\beta_f^t$ denotes a weight of a similarity transformation item of each surface. It is performed continuously and continually by changing the weight until the flip of the surface is removed.

As described above, the present disclosure assigns a greater number of sample pixels to a relatively significant region to minimize distortion of a resulting image. A distorted closed curved surface is restored in a viewing operation during reproduction using a resulting mesh. Uneven distortion like a toothed wheel may occur along a strong horizontal line and a strong vertical line in a restored product.

To solve the foregoing issue, a distortion phenomenon of a quadrangular face including a strong horizontal line and a strong vertical line needs to be minimized. A diagonal line is filtered out, and a remaining element is labeled as one of a vertical line vLine and a horizontal line hLine. Every quadrangular face $q_d^t$ including a line element minimizes an energy function of Equation 9 through optimization.

$$E_k = \sum_d \sum_{\{i,j\} \in hE(hLine \in q_d^t)} \|y_j^t - y_i^t\|^2 + \sum_d \sum_{\{i,j\} \in vE(vLine \in q_d^t)} \|x_j^t - x_i^t\|^2$$ [Equation 9]

Figure 7A:
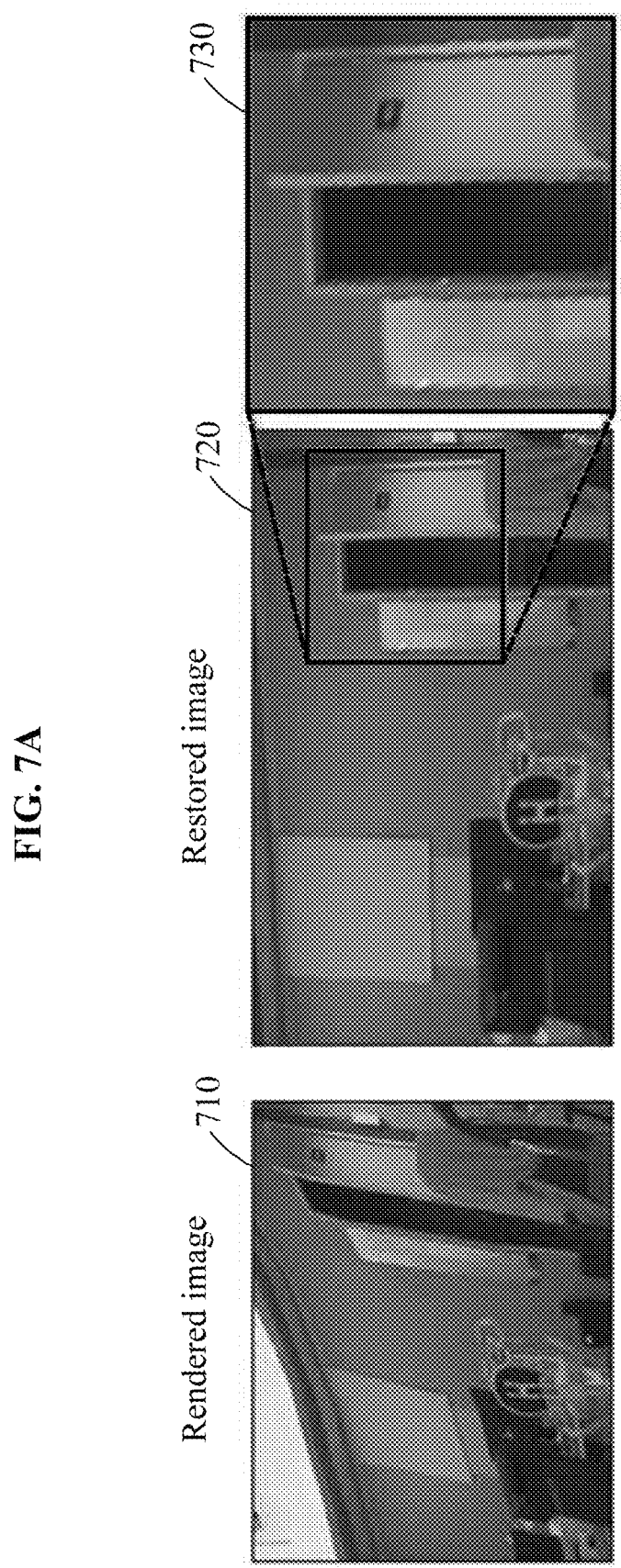
FIGS. 7A and 7B illustrate an effect of preventing distortion of a mesh edge in a quadrangular face according to an embodiment.
Figure 7B:
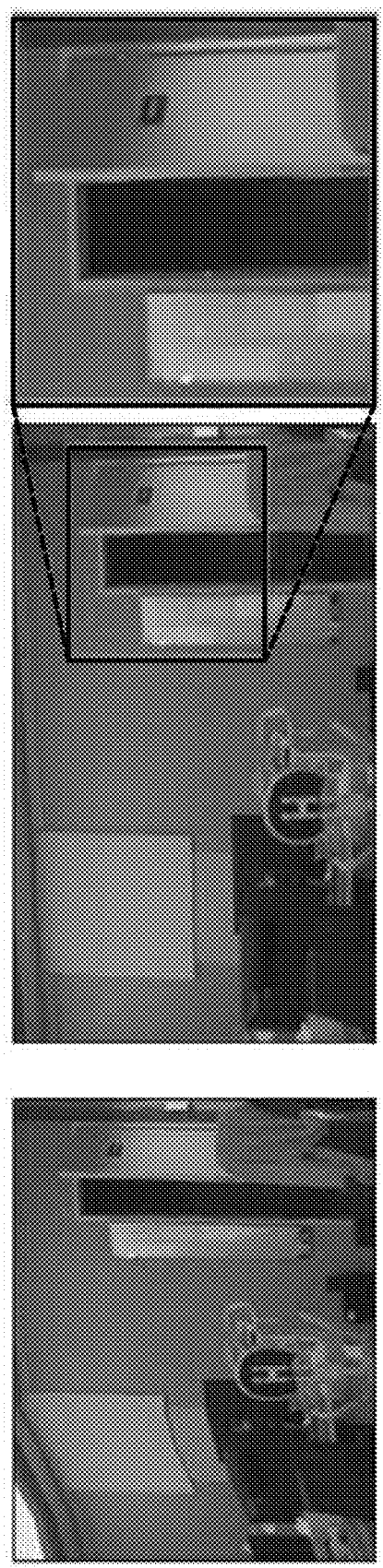

Equation 9 prevents occurrence of distortion of a mesh edge along a line direction in a quadrangular face. FIGS. 7A and 7B illustrate an effect of preventing distortion of a mesh edge in a quadrangular face according to an embodiment. FIG. 7A illustrates rendering using an existing technology and a restored image, and FIG. 7B illustrates rendering using a ray mesh and a restored image according to an embodiment. Referring to FIG. 7A, tilting lines are included in a rendered image 710. The tilting lines are restored to be vertical or horizontal in a restored image 720. However, as shown in an image 730, uneven distortion like a toothed wheel may occur.

Through Equation 9, an hLine region corresponding to a horizontal line may be forced to not be transformed in a vertical direction, and a vLine region corresponding to a vertical line may be forced to not be transformed in a horizontal direction.

To compress an image effectively and prevent a radical change in resolution, a time smoothness item is introduced to optimization as expressed by Equation 10.

$$E_{t2} = \sum_i \left\| x_i^t - \frac{1}{2t_w} \sum_{j \in T(i,t)} x_j \right\|^2 + \left\| y_i^t - \frac{1}{2t_w} \sum_{j \in T(i,t)} y_j \right\|^2$$ [Equation 10]

Time box filtering is applied to significance maps $sx_d^t$ and $sy_d^t$ for each frame with a time window $[t, t+t_w]$. Such simple filtering increasingly smooths a mesh appearance based on a sequence.

Last, $\{x_i^t, y_i^t\}$ that maintain a boundary constraint of Equation 12 to maintain a quadrangular frame and that minimize a sum of the energy functions described above are determined as expressed by Equation 11.

$$\underset{\{x_i^t, y_i^t\}_{t,i}}{\mathrm{argmin}} \sum_t E_g + \alpha_s E_{s2} + \alpha_k E_k + E_{t2}$$ [Equation 11]

$$x_i^t = \begin{cases} 0 & \text{if } v_i^t \text{ is on the left boundary} \\ I_{width} & \text{if } v_i^t \text{ is on the right boundary} \end{cases}$$ [Equation 12]

$$y_i^t = \begin{cases} 0 & \text{if } v_i^t \text{ is on the top boundary} \\ I_{height} & \text{if } v_i^t \text{ is on the bottom boundary} \end{cases}$$

Here, a weight $\alpha_s$ for space smoothness may be 0.5. $\alpha_k$ may be a weight to minimize distortion as described in Equation 9. By solving Equation 11, temporally consistent ray meshes to be used for rendering may be generated. Image coordinates $(x_i, y_i)$ of a resulting mesh are normalized by $I_{width}$ and $I_{height}$.

The projected image is sampled based on a mesh determined through the rendering process. The mesh includes a plurality of mesh points, and longitude and latitude are determined for each mesh point. The image may be sampled through interpolation of intermediate values between the mesh points.

FIGS. 8 through 11 illustrate an example of an apparatus for acquiring multiple images through a plurality of cameras in the calibration operation and a configuration thereof. However, the embodiments are not limited to FIGS. 8 through 11, and other embodiments may also be applied.

A n apparatus for acquiring images through a plurality of cameras and a configuration thereof according to an embodiment are not necessarily limited to the present embodiment, and images may be acquired using various other methods.

Figure 8:
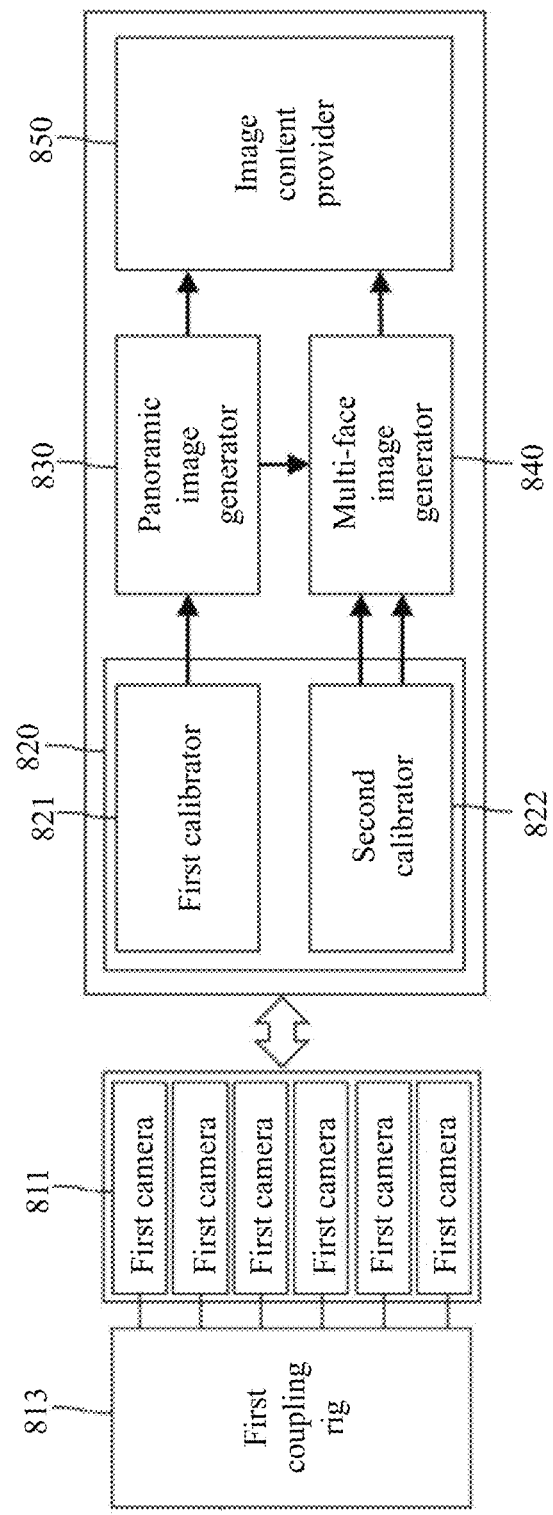
FIG. 8 illustrates a configuration of a system according to an embodiment.

FIG. 8 illustrates a configuration of a system according to an embodiment. Referring to FIG. 8, an image providing apparatus according to an embodiment may include multiple first cameras 811 coupled to a first coupling rig 813, a calibrator 820, a panoramic image generator 830, a multi-face image generator 840, and an image contact provider 850.

The multiple first cameras 811 are configured to acquire and provide multiple omnidirectional images having different capturing viewpoints. It is desirable to implement all of the first cameras 811 using cameras having the same specifications. In this example, all omnidirectional images acquired through the first cameras 811 may have the same angle of view and the same resolution. Thus, calibration and image matching operations to be performed in the future may be more easily performed.

The first coupling rig 813 couples and supports the multiple first cameras 811.

Figure 9:
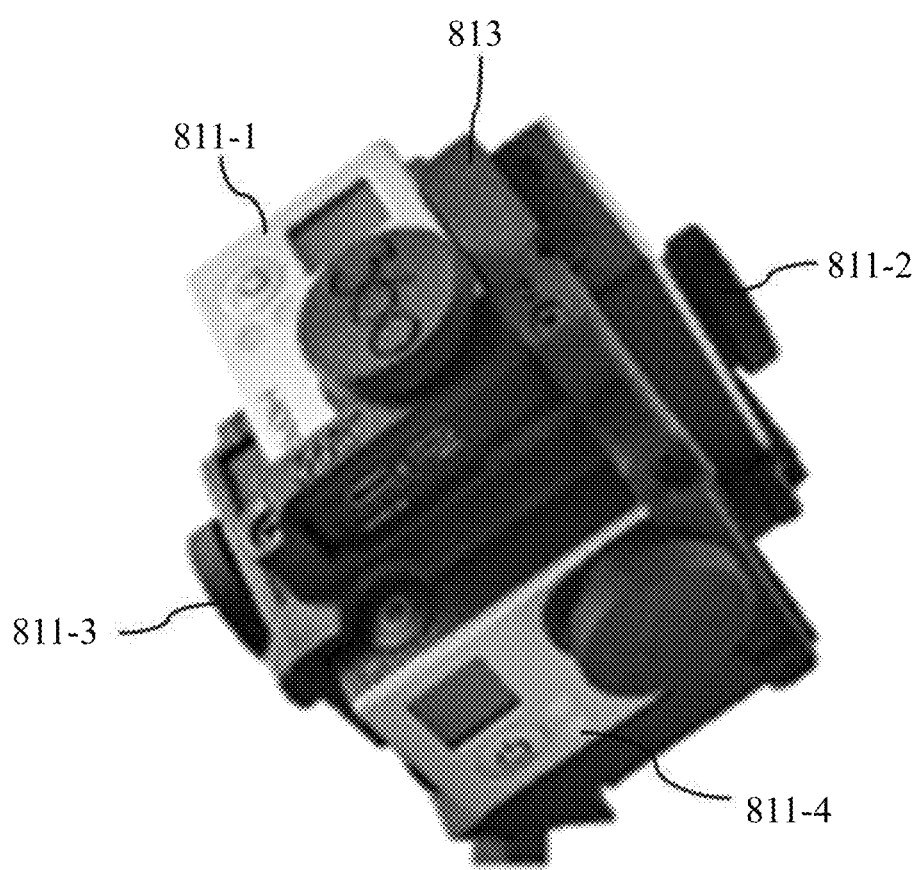
FIG. 9 illustrates a system including a plurality of cameras according to an embodiment.

For example, FIG. 9 illustrates a system including a plurality of cameras according to an embodiment. Referring to FIG. 9, the first coupling rig 813 includes a device to attach and support the first cameras to a front side 811-4, a rear side (not shown), a right side 811-2, a left side 811-3, a top side 811-1, and a bottom side (not shown) such that the first cameras attached to the first coupling rig 813 may simultaneously acquire and provide six omnidirectional images corresponding to a front side direction, a rear side direction, a right side direction, a left side direction, an top side direction, and a bottom side direction, respectively.

Referring to FIG. 8 again, the calibrator 820 includes a first calibrator 821 to figure out a positional relation between the first cameras 811 by performing calibration with respect to the first cameras 811 on the first coupling rig 813.

Figure 10:
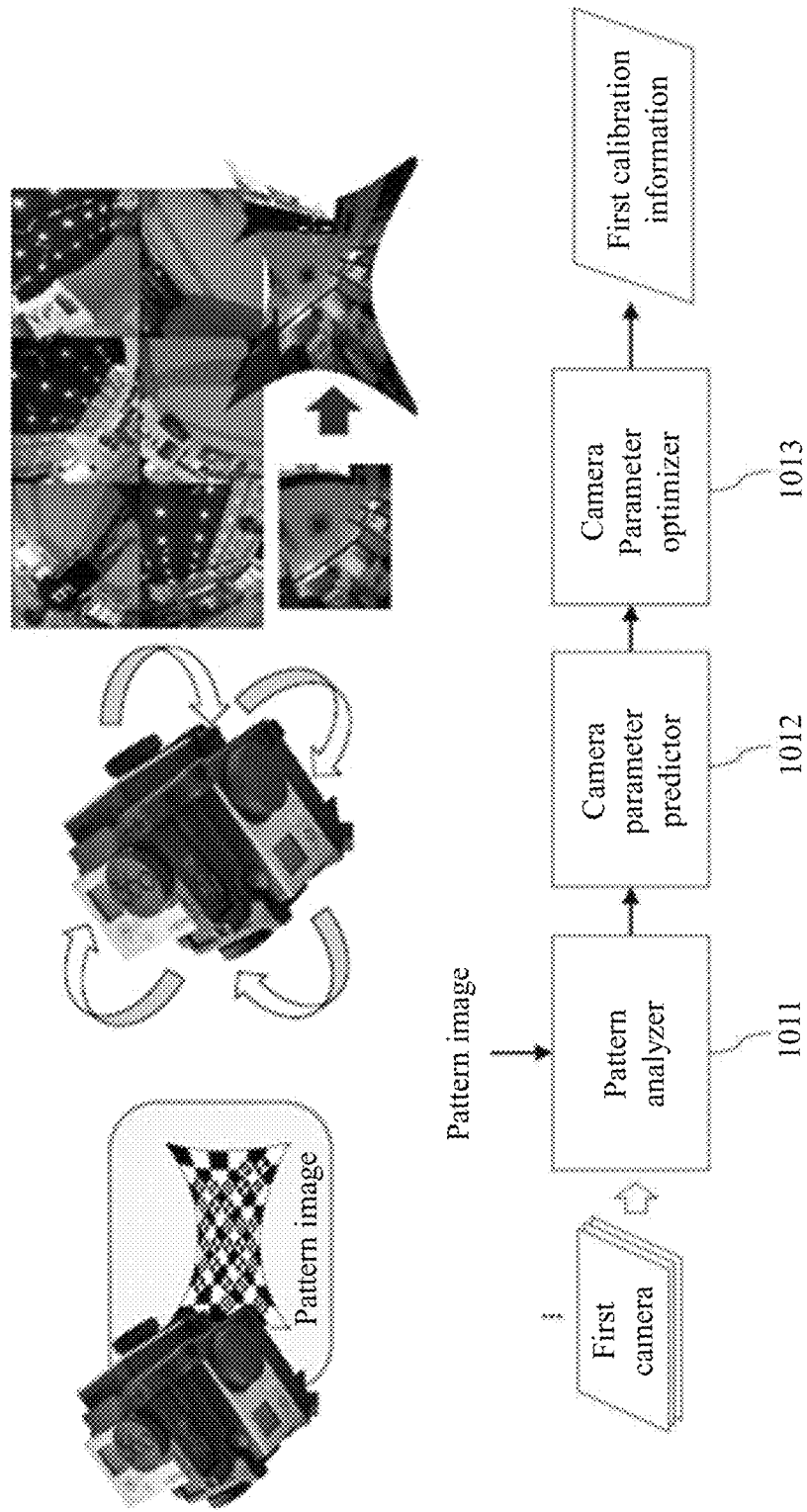
FIG. 10 illustrates a configuration of a system for calibration information according to an embodiment.

In further detail, FIG. 10 illustrates a configuration of a system for calibration information according to an embodiment. Referring to FIG. 10, the first calibrator 821 includes a pattern analyzer 1011, a camera parameter calculator 1012, and a camera parameter optimizer 1013, and may perform a first calibration operation using a scheme described below.

First, a standardized pattern image such as a chessboard is output and lifted to be shown to the first cameras 811 disposed on the first coupling rig, and videos are recorded at the same time. In particular, the present disclosure necessarily requires the pattern image to be in an overlapping region between the first cameras 811, and continually captures the pattern image by changing distances from the cameras to improve the accuracy.

The pattern analyzer 1011 detects the pattern image by analyzing the videos recoded using the first cameras 811, and generates matching information based on frame information and camera information that is shown at the same time.

The camera parameter calculator 1012 calculates relative camera parameters between two adjacent cameras based on the matching information. The camera parameter optimizer 1013 improves the parameters of all of the first cameras calculated by the camera parameter calculator 1012 based on the matching information through non-linear optimization, and generates first calibration information including all the information. That is, the camera parameter optimizer 1013 generates the first calibration information including information related to the positional relation between the first cameras 811.

Referring to FIG. 8 again, the panoramic image generator 830 generates a panoramic image by registering the omnidirectional images acquired through the first cameras 811 into a single image based on the positional relation between the first cameras 811 obtained through the first calibrator 821. The panoramic image generator 830 registers the panoramic image based on the first calibration information.

Figure 11:
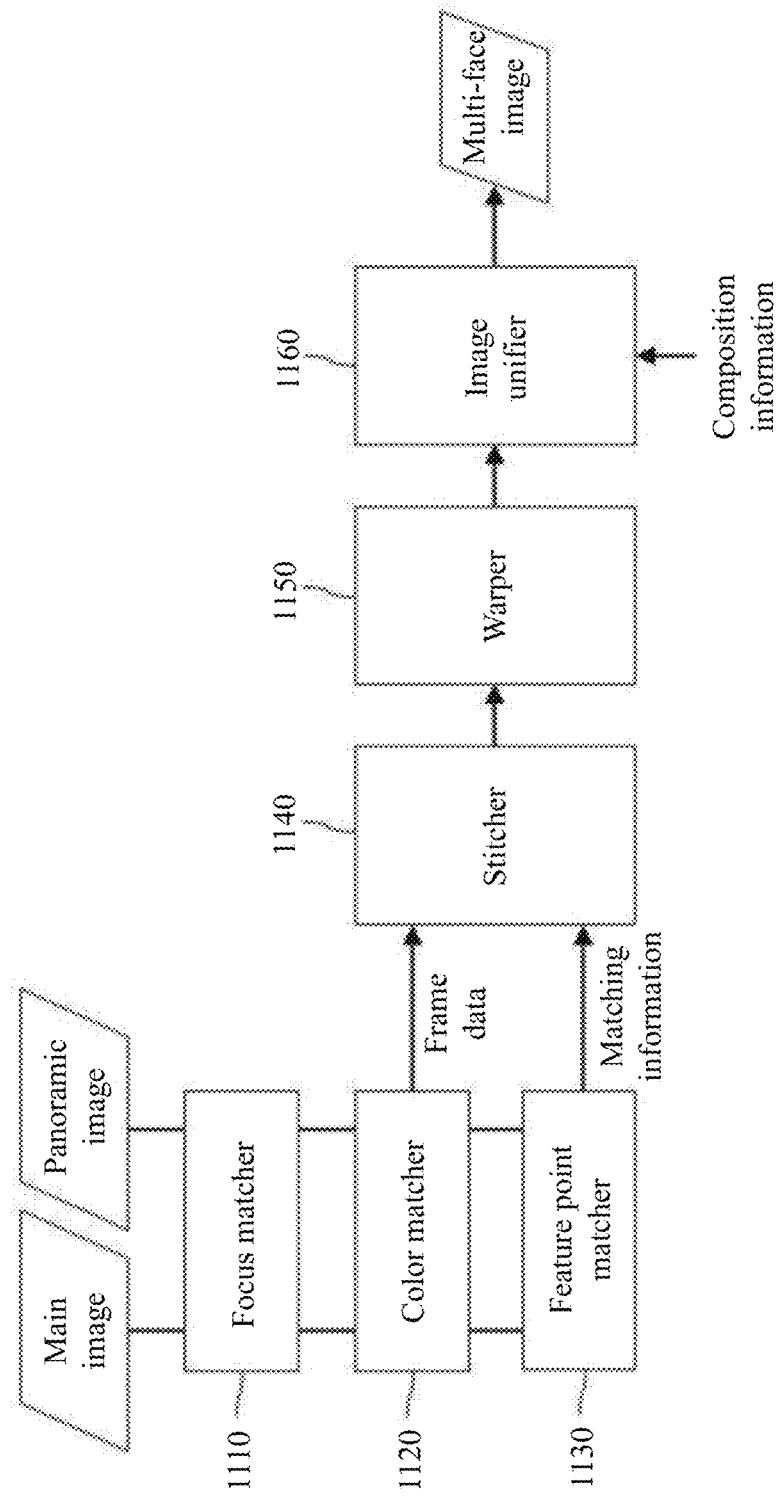
FIG. 11 illustrates a configuration of a system according to an embodiment.

In further detail, FIG. 11 illustrates a configuration of a system according to an embodiment. Referring to FIG. 11, the panoramic image generator 830 includes a focus matcher 1110, a color matcher 1120, a feature point matcher 1130, a stitcher 1140, a warper 1150, and a renderer 1160, and may generate the panoramic image using a scheme described below.

First, the focus matcher 1110 performs initial array of the images based on the positional relation of the first cameras through the first calibration operation, and the color matcher 1120 corrects colors of the images. The feature point matcher 1130 obtains feature points in each image using a feature point extraction algorithm, and finds corresponding points between image feature points using a descriptor with respect to the feature points. In this example, all algorithms of known technologies may be applied as the feature point extraction algorithm.

The stitcher 1140 connects overlapping portions of the images using the corresponding points between the feature points obtained through the feature point matcher 1130, and the warper 1150 performs geometric processing of relocating pixels to make the connected two images natural. The image unifier 1160 unifies the plurality of images based on composition information input by the user.

Referring to FIG. 8 again, the image content provider 850 generates and provides image content including all the information related to the images acquired through the first cameras 811 and the panoramic image generator 830.

Figure 12:
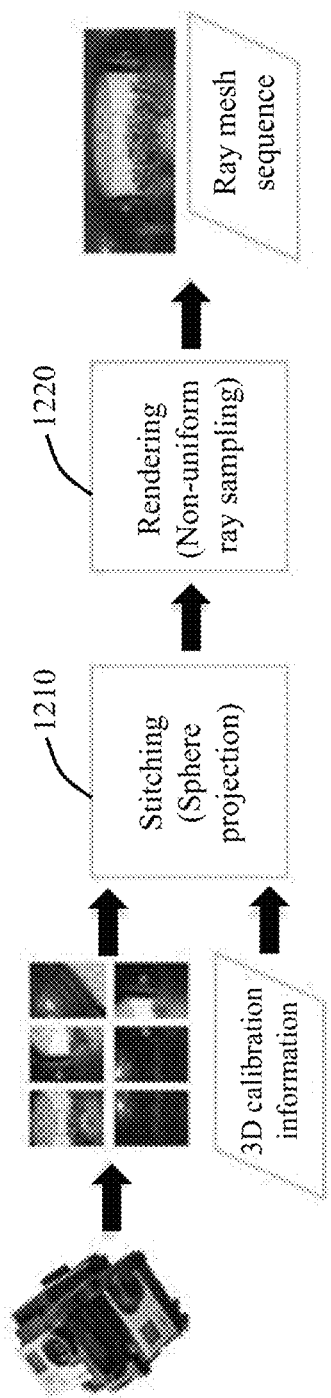
FIG. 12 is a flowchart illustrating a method of generating a spherical image according to an embodiment.

FIG. 12 is a flowchart illustrating a method of generating a spherical image according to an embodiment. In summary, referring to FIG. 12, in a method of producing a single spherical image using a plurality of cameras fixed to a rig and having different capturing viewpoints, there is provided a method of acquiring an optimized spherical image using multiple cameras, the method including stitching operation 1210 to acquire a single image by projecting images acquired from the plurality of cameras on a projection surface of a predetermined irregular closed curved surface based on parameter information. Hereinafter, the spherical image may include a multi-face image. Here, the projection surface of the closed curved surface may vary based on depths of the images.

Further, the method further includes rendering operation 1220 to fit the acquired single image in a quadrangular frame for each region through a non-uniform sampling process. In this example, in the rendering operation, pixels may be arrayed such that a region determined to be relatively significant may have a higher resolution.

Figure 13:
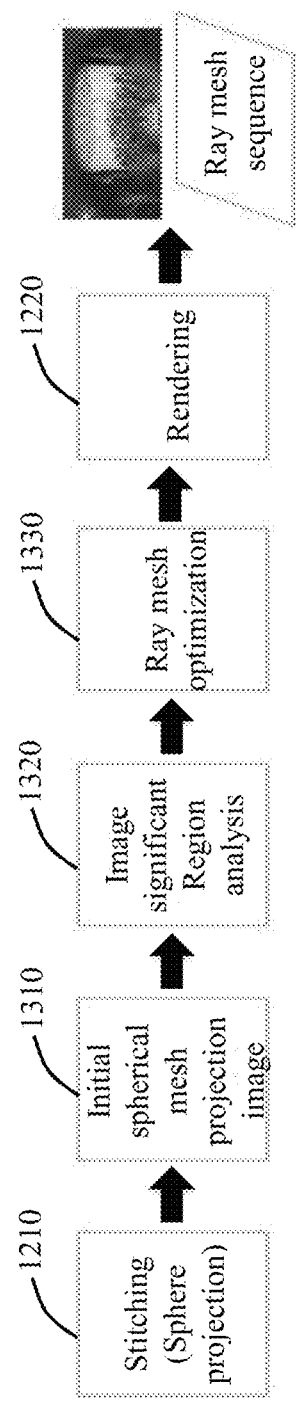
FIG. 13 is a flowchart illustrating a rendering method according to an embodiment.

Further, FIG. 13 is a flowchart illustrating a rendering method according to an embodiment. Referring to FIG. 13, the method may further include, between the switching operation 1210 and the rendering operation 1220, operation 1310 of acquiring an initial spherical mesh projection image, operation 1320 of analyzing a significant region in the image, and operation 1330 of optimizing a ray mesh.

Figure 14:
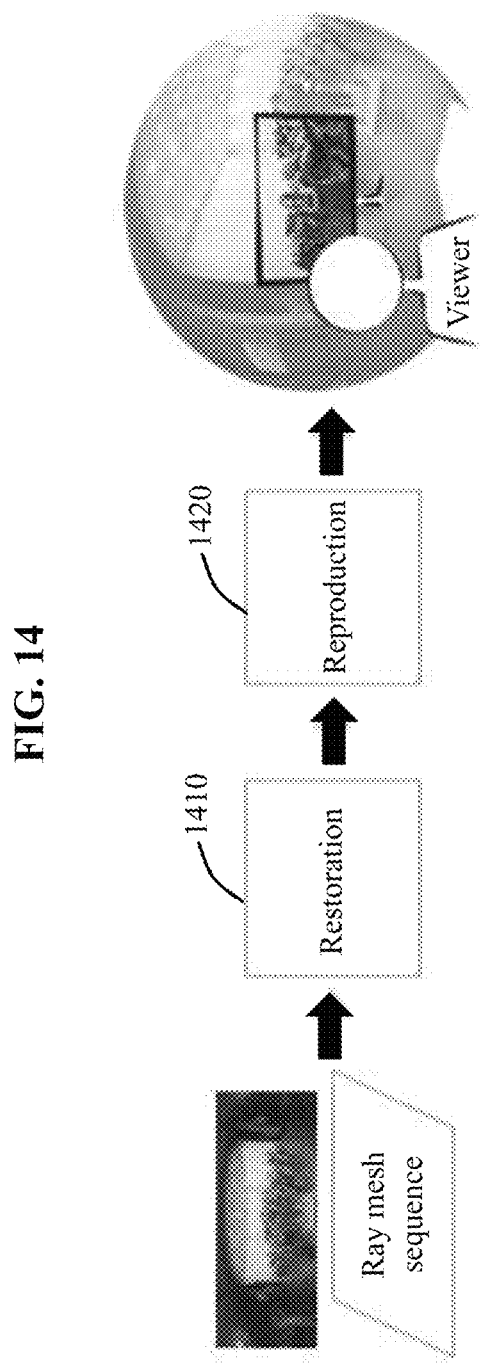
FIG. 14 is a flowchart illustrating a viewing method according to an embodiment.

Further, FIG. 14 is a flowchart illustrating a viewing method according to an embodiment. Referring to FIG. 14, a method of reproducing an image includes operation 1410 of restoring a ray mesh sequence generated through non-uniform rendering, and operation 1420 of reproducing a restored image.

The ray mesh sequence includes a sampled image and information related to a mesh. Here, the information related to the mesh may include information related to sizes of quadrangular faces included in the mesh. The operation 1410 of restoring the ray mesh sequence may include mapping vertices included in the mesh to vertices included in the viewing sphere based on the information related to the sizes of the quadrangular faces.

In an example, texture mapping based on mesh information may be used in the restoring operation 1410. For example, when texture-mapping to a virtual 3D sphere, u, v values may be adjusted based on the mesh information so as to restore a non-uniform rendering result.

Figure 15:
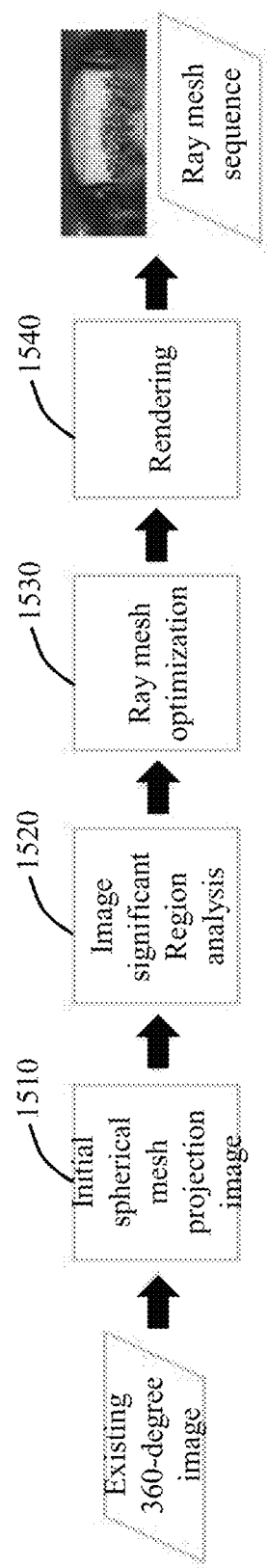
FIG. 15 is a flowchart illustrating a remastering method according to an embodiment.

Further, FIG. 15 is a flowchart illustrating a remastering method according to an embodiment. Referring to FIG. 15, in relation to an existing content remastering method through non-uniform rendering, a less resolution may be represented with high quality when an existing 360-degree image is remastered. For example, when an existing 360-degree image of 8K is remastered to 4K using a non-uniform rendering method and viewed, a significant region may be viewed with a higher quality when compared to a 4K image generated using general down-sampling.

For this, the method may include operation 1510 of acquiring an initial spherical mesh projection image by acquiring an existing 360-degree image, operation 1520 of analyzing a significant region in the image, operation 1530 of optimizing a ray mesh, and operation 1540 of generating a ray mesh sequence through rendering.

Figure 16:
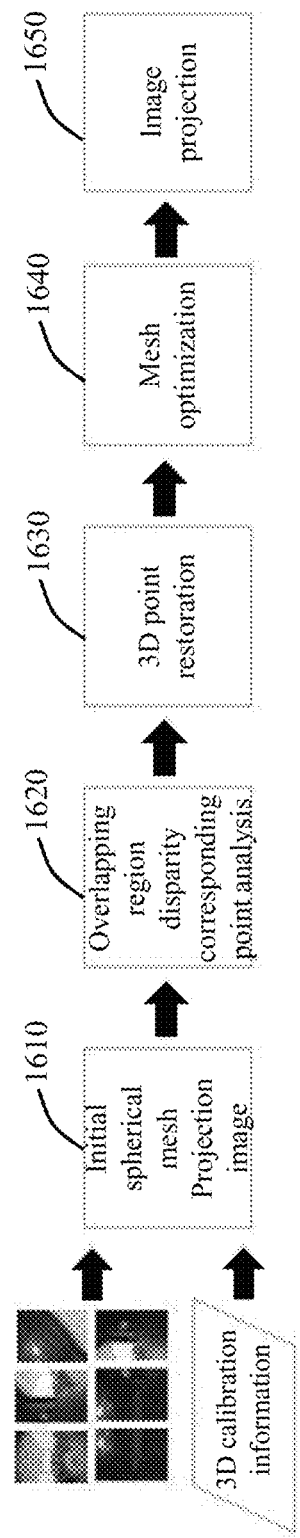
FIG. 16 is a flowchart illustrating a stitching method according to an embodiment.

Further, FIG. 16 is a flowchart illustrating a stitching method according to an embodiment. Referring to FIG. 16, the image providing method includes operation 1610 of acquiring an initial spherical mesh projection image, operation 1620 of analyzing a disparity corresponding point in an overlapping region, operation 1630 of restoring a 3D point, operation 1640 of optimizing a mesh, and operation 1650 of projecting an image.

The description provided with reference to FIGS. 1 through 11 may be applied to the operations shown in FIGS. 12 through 16, and thus duplicated description will be omitted for conciseness.

The above description is provided only to illustratively describe the technical idea of the present disclosure, and thus various changes and modifications may be made to the embodiments by those having ordinary skill in the art without departing from the essential features of the present disclosure. Therefore, the embodiments disclosed herein are intended to not to limit, but illustrate the technical idea, and the scope of the technical idea is not limited by the embodiments. The protection scope of the present disclosure should be interpreted based on the following claims, and all technical ideas included within the scope equivalent to the claims should be construed as being included within the scope of the present disclosure.

The embodiments described herein may be implemented using hardware components, software components, and/or a combination of the hardware components and the software components. For example, the apparatus, the method, and the components described herein may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments by those having ordinary skill in the art. For example, suitable results may be achieved if the described techniques are performed in a different order and/or if components in a described system, architecture, device, or circuit are combined in a different manner and/or replaced or supplemented by other components or their equivalents.

The invention claimed is:

1. A method of generating a spherical image, the method comprising:
acquiring images from a plurality of cameras having different capturing viewpoints;
determining a projection surface of an irregular closed curved surface based on depths of the images; and
projecting the images on the projection surface of the irregular closed curved surface based on parameter information of the plurality of cameras,
wherein the projection surface of the irregular closed curved surface includes a plurality of mesh points, and the determining comprises determining a depth of a target mesh point in a target frame based on a depth of a feature point that is extracted from an overlapping region between adjacent images and adjacent to the target mesh point.

2. The method of claim 1, wherein the determining of the depth of the target mesh point comprises determining the depth of the target mesh point further based on any one or any combination of a depth of a mesh point adjacent to the target mesh point, and a depth of a mesh point corresponding to the target mesh point in a frame adjacent to the target frame.

3. A non-transitory computer-readable medium comprising a program for instructing a computer to perform the method of claim 1.

4. A method of generating a spherical image, the method comprising:
acquiring images from a plurality of cameras having different capturing viewpoints;
projecting the images on a projection surface of an irregular closed curved surface based on parameter information of the plurality of cameras; and
rendering the projected image based on a mesh set along the projection surface of the irregular closed curved surface,
wherein the rendering comprises:
determining a target size of a quadrangular face included in the mesh based on significances of the quadrangular face;
determining a size of the quadrangular face based on the target size of the quadrangular face; and
sampling the projected image based on the size of the quadrangular face.

5. The method of claim 4, wherein the rendering further comprises arraying pixels such that a relatively significant region in the projected image has a higher resolution.

6. The method of claim 4, wherein the determining of the size of the quadrangular face comprises determining the size of the quadrangular face further based on any one or any combination of a similarity transformation item of the quadrangular face, a vertical and horizontal distortion prevention item in the quadrangular face, and a time smoothness item of the quadrangular face.

7. A non-transitory computer-readable medium comprising a program for instructing a computer to perform the method of claim 4.

8. A method of reproducing a spherical image, the method comprising:
   obtaining information related to a mesh generated through non-uniform rendering;
   acquiring an image sampled through the non-uniform rendering; and
   viewing to map the sampled image to a viewing sphere based on the information related to the mesh,
   wherein the information related to the mesh comprises information related to sizes of quadrangular faces included in the mesh, and the viewing comprises mapping vertices included in the mesh to vertices included in the viewing sphere based on the information related to the sizes of the quadrangular faces.

9. A non-transitory computer-readable medium comprising a program for instructing a computer to perform the method of claim 8.

10. A method of generating a spherical image, the method comprising:
    acquiring a 360-degree image generated using images acquired from a plurality of cameras having different capturing viewpoints; and
    rendering to fit the acquired 360-degree image in a quadrangular frame for each region through a non-uniform sampling process,
    wherein the rendering comprises:
      determining a target size of the quadrangular frame based on significances of the quadrangular frame;
      determining a size of the quadrangular frame based on the target size of the quadrangular frame; and
      sampling the projected image based on the size of the quadrangular frame.

11. The method of claim 10, wherein the rendering comprises arraying pixels such that a relatively significant region in the 360-degree image has a higher resolution.

12. The method of claim 10, wherein the determining of the size of the quadrangular frame comprises determining the size of the quadrangular frame further based on any one or any combination of a similarity transformation item of the quadrangular frame, a vertical and horizontal distortion prevention item in the quadrangular frame, and a time smoothness item of the quadrangular frame.

* * * * *